(12) United States Patent
Larsson et al.

(10) Patent No.: US 10,390,243 B2
(45) Date of Patent: Aug. 20, 2019

(54) METHOD FOR OPERATING A USER EQUIPMENT IN A WIRELESS RADIO NETWORK

(71) Applicant: Sony Corporation, Tokyo (JP)

(72) Inventors: Bo Larsson, Malmö (SE); Zhinong Ying, Lund (SE); Rickard Ljung, Helsingborg (SE); Peter Karlsson, Lund (SE); Erik Bengtsson, Eslöv (SE); Vanja Plicanic Samuelsson, Lund (SE)

(73) Assignee: Sony Corporation, Tokyo (JP)

( * ) Notice: Subject to any disclaimer, the term of this patent is extended or adjusted under 35 U.S.C. 154(b) by 7 days.

(21) Appl. No.: 15/105,057

(22) PCT Filed: Nov. 19, 2014

(86) PCT No.: PCT/EP2014/074992
§ 371 (c)(1),
(2) Date: Jun. 16, 2016

(87) PCT Pub. No.: WO2015/090816
PCT Pub. Date: Jun. 25, 2015

(65) Prior Publication Data
US 2016/0316385 A1 Oct. 27, 2016

(30) Foreign Application Priority Data
Dec. 19, 2013 (EP) .................................... 13198413

(51) Int. Cl.
*H04W 24/08* (2009.01)
*H04W 36/00* (2009.01)
(Continued)

(52) U.S. Cl.
CPC ............. *H04W 24/08* (2013.01); *H04B 7/15* (2013.01); *H04W 36/0088* (2013.01); *H04W 88/04* (2013.01)

(58) Field of Classification Search
None
See application file for complete search history.

(56) References Cited

U.S. PATENT DOCUMENTS 8,559,867 B2* 10/2013 Li ........................ H04B 7/2606
455/7
9,332,558 B2* 5/2016 Pikhletsky .......... H04W 72/085
(Continued)

FOREIGN PATENT DOCUMENTS

CN 101453745 A 9/2012
EP 2222119 A1 8/2010
(Continued)

OTHER PUBLICATIONS

"3rd Generation Partnership Project; Technical Specification Group Radio Access Network; Evolved Universal Terrestrial Radio Access (E-UTRA); Relay architectures for E-UTRA (LTE-Advanced) (Release 9)", 3GPP Draft; R2-101900 TR 36806 V200, 3rd Generation Partnership Project (3GPP), Mobile Competence Centre ; 650, Route Des Lucioles ; F-06921 Sophia-Antipolis Cedex ; France, vol. RAN WG2, Jun. 23, 2010 (Jun. 23, 2010), XP050450793, paragraph [4.2.4.3].
(Continued)

*Primary Examiner* — Bunjob Jaroenchonwanit
(74) *Attorney, Agent, or Firm* — Tucker Ellis, LLP

(57) ABSTRACT

The present invention relates to a method (300) for operating a user equipment (106) in a wireless radio network (100). The wireless radio network (100) comprises a base station (101) and at least one node (105) configured to relay communication data between the user equipment (106) and the base station (101). According to the method, a relayed
(Continued)

communication state is determined (301) and a measurement of characteristics of further direct radio transmission links between the user equipment (106) and the wireless radio network (100) is initiated (302) depending on the relayed communication state.

20 Claims, 1 Drawing Sheet

(51) Int. Cl.
*H04B 7/15* (2006.01)
*H04W 88/04* (2009.01)

(56) References Cited

U.S. PATENT DOCUMENTS

| | | | | |
|---|---|---|---|---|
| 2005/0228576 | A1* | 10/2005 | Katrak | F02P 11/00 701/114 |
| 2008/0062911 | A1* | 3/2008 | Choi | H04B 7/155 370/315 |
| 2008/0125125 | A1* | 5/2008 | Choi | H04W 36/0083 455/436 |
| 2008/0279134 | A1* | 11/2008 | Lee | H04B 7/155 370/315 |
| 2009/0104911 | A1* | 4/2009 | Watanabe | H04W 36/30 455/436 |
| 2009/0247072 | A1* | 10/2009 | Nakamura | H04B 7/15557 455/11.1 |
| 2010/0248613 | A1* | 9/2010 | Miyoshi | H04W 88/04 455/7 |
| 2010/0261480 | A1* | 10/2010 | Cho | H04B 7/2606 455/445 |
| 2010/0311322 | A1* | 12/2010 | Bao | H04B 7/15542 455/9 |
| 2010/0322187 | A1* | 12/2010 | Tani | H04L 1/0007 370/331 |
| 2011/0124330 | A1* | 5/2011 | Kojima | H04W 36/32 455/424 |
| 2011/0142013 | A1* | 6/2011 | Manssour | H04B 7/15521 370/336 |
| 2011/0194407 | A1* | 8/2011 | Ji | H04B 7/2606 370/226 |
| 2011/0195735 | A1* | 8/2011 | Irmer | H04W 52/346 455/509 |
| 2011/0263264 | A1* | 10/2011 | Fan | H04W 92/20 455/449 |
| 2011/0268064 | A1* | 11/2011 | Chen | H04L 5/003 370/329 |
| 2011/0292862 | A1* | 12/2011 | Shimizu | H04B 7/15528 370/315 |
| 2012/0028627 | A1* | 2/2012 | Hunzinger | H04W 36/0083 455/422.1 |
| 2012/0108253 | A1* | 5/2012 | Mao | H04W 48/20 455/450 |
| 2012/0127883 | A1* | 5/2012 | Chang | H04B 7/155 370/252 |
| 2012/0134318 | A1* | 5/2012 | Park | H04W 68/00 370/315 |
| 2012/0170508 | A1* | 7/2012 | Sawai | H04B 7/155 370/315 |
| 2012/0184203 | A1* | 7/2012 | Tulino | H04W 52/244 455/7 |
| 2013/0137441 | A1* | 5/2013 | Kruglick | H04B 7/155 455/445 |
| 2013/0223324 | A1* | 8/2013 | Somasundaram | H04W 16/26 370/315 |
| 2013/0225175 | A1* | 8/2013 | Obuchi | H04B 7/15507 455/436 |
| 2013/0260760 | A1* | 10/2013 | Pan | H04W 36/32 455/436 |
| 2013/0279364 | A1* | 10/2013 | Nagata | H04B 7/155 370/252 |
| 2013/0308521 | A1* | 11/2013 | Mikhail | H04W 72/085 370/315 |
| 2013/0336202 | A1* | 12/2013 | Oh | H04B 7/155 370/315 |
| 2014/0016537 | A1* | 1/2014 | Khobare | H04W 36/30 370/315 |
| 2014/0064158 | A1* | 3/2014 | Timus | H04W 36/30 370/279 |
| 2014/0192704 | A1* | 7/2014 | Yi | H04W 24/10 370/315 |
| 2014/0192781 | A1* | 7/2014 | Teyeb | H04W 36/34 370/331 |
| 2015/0024757 | A1* | 1/2015 | Bulakci | H04W 36/0088 455/437 |
| 2015/0103732 | A1* | 4/2015 | Seo | H04L 5/001 370/315 |
| 2015/0289188 | A1* | 10/2015 | Srinivasan | H04W 36/18 370/230 |
| 2016/0150576 | A1* | 5/2016 | Moisio | H04W 24/02 370/329 |

FOREIGN PATENT DOCUMENTS

| | | |
|---|---|---|
| WO | 2013120530 | 8/2013 |
| WO | 2013120530 A1 | 8/2013 |
| WO | 2013166371 | 11/2013 |

OTHER PUBLICATIONS

International Search Report and Written Opinion; dated Feb. 3, 2015; issued in International Patent Application No. PCT/EP2014/074992.

Chinese Search Report from corresponding Chinese Application No. 201480066790.1, dated Aug. 28, 2018; 2 pages.

* cited by examiner

METHOD FOR OPERATING A USER EQUIPMENT IN A WIRELESS RADIO NETWORK

FIELD OF THE INVENTION

The present invention relates to a method for operating a user equipment in a wireless radio network. The present invention relates especially to operating the user equipment in the wireless radio network when communication data of the user equipment is not directly communicated between a base station of the wireless network and the user equipment, but indirectly via a further node, for example another user equipment, with a so called relay technique. The present invention relates furthermore to a user equipment and base station configured to perform the method of the present invention.

BACKGROUND OF THE INVENTION

In access technologies for wireless radio networks, especially for cellular wireless radio networks like WCDMA (wideband code division multiple access) and LTE (long term evolution) defined in 3GPP (third generation partnership project) and future 5G (fifth generation) systems, relay techniques are one of the ways for improving capacity and coverage in the cells. Relay scenarios can comprise stationary or mobile relay points with mobile user equipments (UE) either using a relay point or being a relay point. An exemplary relay scenario is shown in FIG. 1. FIG. 1 shows a wireless radio network 100 comprising a first and second base station 101, 102. A first cell 103 is served by the first base station 101. A second cell 104 is served by the second base station 102. Within the first cell 103 a first user equipment 105 and a second user equipment 106 are located. The first user equipment 105 is arranged closer to the first base station 101 and may therefore provide a better communication performance by relaying communication data from the second user equipment 106 than a direct communication between the second user equipment 106 and the base station 101. Therefore, as indicated by the dashed connections between the base station 101, the first user equipment 105 and the second user equipment 106, communication data from the second user equipment 106 is relayed via the first user equipment 105 to the base station 101.

In general, as implemented in current access technologies, a hand over of a voice or data connection for a user equipment using one cell, for example cell 103, to another cell, for example cell 104, is initiated by a current base station, for example base station 101, on the basis of a neighbor cell signal strength feedback from the user equipment. To be able to perform the necessary measurements on the neighboring cells, a base station scheduler is responsible to ensure that measurements can be conducted, e.g. by providing availability for measurement gaps if required by the user equipment, and the measurements are triggered when the current signal level strength as experienced or received at the user equipment decreases below a certain operator predefined threshold. In detail, for example, if the user equipment requires measurement gaps to identify and measure inter-frequency and/or inter-RAT (radio access technology) cells, the wireless radio access network must provide a single measurement gap pattern with constant gap duration for a concurrent monitoring of all frequency layers of the RATs. However, depending on the capabilities of the user equipment, the user equipment may be capable of conducting measurements while continuing communication without requiring explicit measurement gaps. Still, the network, e.g. the base station controller, is responsible to request the measurements.

In relay scenarios there may occur situations in which the signal strength at the user equipment does not fall below the operator defined threshold for neighbor cell measurement and thus a hand over may not occur, although it may be advisable to switch to another relay point or base station due to the better signal strength and load balancing in the neighboring cell. Such a scenario will be explained in the following in connection with FIG. 1.

The second user equipment 106 is connected to the first user equipment 105 which is acting as a relay point and has direct contact with the controlling first base station 101. Then, the second user equipment 106 is moving towards the second cell 104 as indicated by the arrow in FIG. 1 and is now positioned as indicated by reference sign 106'. In other words, the second user equipment 106 is entering the second cell 104 which could provide a more suitable link for communication via the second base station 102, for example due to improved end to end radio conditions, network cell load balancing, network scheduling strategies to avoid relaying and so on. However, as the signal strength to and from the first user equipment 105 is still good enough, the second user equipment 106 will not trigger any neighbor measurements and the radio network 100 will not be made aware of the fact that the second user equipment 106 is within cell 104. Hence, no handover from the first base station 101 to the second base station 102 will take place, but the communication will be relayed via the first user equipment 105 as indicated by the dashed connections between the second user equipment 106', the first user equipment 105 and the first base station 101.

Therefore, there is a need for an improved operating of a user equipment in a wireless radio network, especially in connection with relayed communications.

SUMMARY OF THE INVENTION

According to the present invention this object is achieved by a method for operating a user equipment in a wireless radio network as defined in claim 1, a user equipment for a wireless radio network as defined in claim 11, and a base station for a wireless radio network as defined in claim 14. The dependent claims define preferred and advantageous embodiments of the invention.

According to an aspect of the present invention, a method for operating a user equipment in a wireless radio network, for example a cellular access network, is provided. The wireless radio network comprises a base station and at least one node, for example another stationary or mobile user equipment. The at least one node is configured to relay communication data, for example for a voice connection or a data connection, between the user equipment and the base station. The user equipment is configured to communicate directly with one node of the at least one node via a corresponding direct radio transmission link. In other words, the method relates to the above described relay scenario in which the base station is communicating directly with the node acting as a relay point, and the node is directly communicating with the user equipment. Although the user equipment may directly communicate with the base station, the communication is relayed via the node for improving capacity and/or coverage in the cell. According to the method, a relayed communication state is determined. The relayed communication state indicates that the user equipment is communicating via the one node acting as a relay. In other words, the relayed communication state indicates that the user equipment is communicating with the one node via the direct radio transmission link and that the communication data of the user equipment is relayed via the one node. Depending on the relayed communication state a measurement of characteristics of a further direct radio transmission link between the user equipment and the wireless radio network is initiated. The further direct radio transmission link may be for example a direct radio transmission link between the user equipment and a further base station of the wireless radio network, or a direct radio transmission link between the user equipment and a further node configured to relay communication data of the user equipment. The further node may be arranged within the same cell as the user equipment or the one node and may therefore be served by the same base station, or the further node may be arranged within another cell and may therefore be served by another base station. In other words, user equipment measurements are activated independently of the relayed signal quality when the user equipment is operated in a relayed communication. This ensures that a handover may be initiated even when the signal quality experienced at the user equipment is still sufficient. Thus, improved end to end radio conditions, network cell load balancing and network scheduling strategies can be improved even in relayed scenarios.

The above-described method may be implemented by modifying corresponding radio network standards, for example 3GPP standards, in order to enable the network to mandate repeated neighbor measurements by the user equipment or to activate user equipment measurements at certain times independently of the relayed signal quality. This will be described in more detail in the following embodiments. A handover as it is used in the present description, may relate to at least one of the following communication path changes. When the user equipment is involved in a relayed communication via a relay node, the user equipment may switch the communication path to another relaying node within the same cell, to another relaying node within another cell, to the base station of the cell at which the user equipment is currently registered, or to a base station of another (neighboring) cell.

According to an embodiment, for initiating the measurement of characteristics of the further direct radio transmission link, a measurement gap for the measurement is provided by the wireless radio network depending on the relayed communication state. For example, when it is determined that the user equipment is communicating via a relayed communication, a measurement gap is provided by a network control layer or a base station of the wireless radio network. Furthermore, the user equipment is requested to report the characteristics of the further direct radio transmission depending on the relayed communication state, for example, when a relayed communication has been detected. Determining, if a relayed communication is present, can be easily performed for example by a base station which has to forward information to the user equipment via the relaying node instead of sending information to the user equipment directly. Furthermore, protocol elements for requesting the user equipment to perform and report measurements concerning alternative transmission paths are already existing in current access technology standards. Therefore, this embodiment may be realized completely by changes in the base stations only.

According to a further embodiment, for initiating the measurement of the characteristics of the further direct radio transmission links, the wireless radio network provides a measurement gap independently from the relayed communication state, and the characteristics of the further direct radio transmission links are periodically measured depending on the relayed communication state, for example triggered by a timer in the user equipment. By providing the measurement gaps in general, the user equipment has the opportunity to perform measurements periodically whenever the user equipment is involved in a relayed communication, and may transmit the measurement results to enable the base station or the wireless radio network to perform a handover depending on the reported measurement results. Protocol elements for reporting the measurement results are already defined in present access network standards and may be used without modification. Additionally, communication overhead between the user equipment and the base station may be reduced.

According to a further embodiment, for initiating the measurement, the user equipment may report to the radio access network that the user equipment has detected a degraded transmission quality independently from an actual transmission quality. Such a reporting is performed depending on the relayed communication state, for example when the user equipment has established a relayed communication via another node in the wireless radio network. Thus, the user equipment may pretend a degraded transmission quality, although actually the transmission quality is still sufficient. However, due to this fake, the base station or a network controller of the wireless radio network initiates procedures which are already defined in present standards for neighbor cell measurements and ensures that a network scheduler provides measurement gaps to give the user equipment the possibility to perform the measurements. Therefore, this embodiment may be implemented without any changes of the protocol elements between the user equipment and the wireless radio network and furthermore, no modifications at the base stations or the network control layer are necessary.

According to another embodiment, depending on the relayed communication state the characteristics of the further direct radio transmission link is measured and compared with a threshold, and the measured characteristics are reported depending on the comparison. For example, the threshold may be adjusted such that the measured characteristics are reported only in situations, when it is likely that the reported measurement results are relevant for the network. This may minimize or reduce the amount of control signaling in the communication between the user equipment and the wireless radio network. For example, the threshold may comprise a predetermined received signal strength value, a predetermined symbol error rate value, a received signal strength value derived from a received signal strength of the direct radio communication between the user equipment and the one node, and a symbol error node value derived from a symbol error rate of the direct radio communication between the user equipment and the one node. For example, it may be determined if a measured neighbor cell has a received signal strength or a signal quality (for example via the symbol error rate) above a defined value. Furthermore, the measured neighbor cells signal strength or quality may be compared with the relayed link signal strength or quality. The signal strength and quality measurement and comparison may be combined with a predetermined time period value. For example it may be determined if a measured neighbor cell signal strength or quality has for at least a certain amount of time exceeded certain values. In the same way, neighbor cell measurements may be compared with relayed link measurements, for example by determining if a measured neighbor cell signal strength or quality has for at least a certain amount of time exceeded the relayed link signal strength or quality. Thus, the communication amount may be reduced to situations which are relevant for the wireless radio network, for example for deciding a handover. Furthermore, measured characteristics may be reported when the user equipment detects a new cell, e.g. independently of measured signal strength and symbol error rate. For example, the network may prefer to initiate a handover if the current cell is congested even if the newly detected cell does not meet the provisioned signal conditions, but the signals conditions are still "good enough".

According to a further embodiment, the thresholds are transmitted from the wireless radio network to the user equipment. This enables an operator to configure the user equipments appropriately for ensuring reasonable handovers without increasing communication overhead excessively.

According to an embodiment, the characteristics of the further direct radio transmission link, for which a measurement is initiated, comprises at least one of a received signal strength and a symbol error rate. These characteristics may be easily determined at the user equipment and provide reliable information for handover decisions.

According to an embodiment, the at least one node which acts as a relay node may comprise a further user equipment. In other words, each user equipment may serve as a relay node or may be used as a terminal equipment in the wireless radio network. Implementing both functionalities within the user equipment supports improving capacity and coverage of the wireless radio network.

According to a further aspect of the present invention, a user equipment for a wireless user network is provided. The wireless radio network comprises a base station and at least one node, for example a further user equipment. The at least one node is configured to relay communication data between the user equipment and the base station. The user equipment comprises a wireless radio interface for communicating wirelessly with one node of the at least one node via a corresponding direct radio transmission link. The user equipment comprises furthermore a processing device, for example a microprocessor or a controller, configured to determine a relayed communication state and to initiate a measurement depending on the determined relayed communication state. The relayed communication state indicates that the user equipment is communicating with the one node via a direct radio transmission link and that communication data of the user equipment is relayed via the one node. The measurement relates to a measurement of characteristics of a further direct radio transmission link between the user equipment and the wireless radio network. For example, the measurement may relate to characteristics of a direct radio transmission link between the user equipment and a base station of another cell of the wireless radio network, or to a direct radio transmission link between the user equipment and another node acting as a relay node. By initiating a measurement of characteristics of further direct radio transmission links available to the user equipment, a handover of a data communication from one cell or one relay node to another cell or another relay node may be initiated by the wireless radio network based on the measured characteristics for improving capacity, load balancing, network scheduling strategies and so on within the wireless radio network. Furthermore, the user equipment may be configured to perform the above-described method and comprises therefore the advantages described above in connection with the method.

According to an embodiment, the user equipment comprises for example a mobile device, like a mobile phone, a personal digital assistant, a tablet computer or a mobile computer.

According to another aspect of the present invention, a base station for a wireless radio network is provided. The wireless radio network comprises the base station and at least one node which is configured to relay communication data between a user equipment and the base station. The user equipment is configured to communicate directly with one of the at least one node via a corresponding direct radio transmission link. The base station comprises a wireless radio interface and the processing device. The wireless radio interface is configured to communicated wirelessly with at least one of the user equipment and the at least one node via a direct radio transmission link. In other words, the wireless radio interface of the base station may communicate directly with the user equipment or with the node or with both. For improving capacity and coverage in the cell served by the base station, the node may act as a relay such that the base station is communicating directly with the node and is communicating indirectly with the user equipment via the node. The processing device of the base station is configured to determined a relayed communication state which indicates that the user equipment is communicating with the node via the direct radio transmission link, and that communication data of the user equipment is relayed via the node. Depending on the relayed communication state the processing device initiates a measurement of characteristics of a further direct radio transmission link between the user equipment and the wireless radio network. The measurement of the characteristics may be performed based on a corresponding trigger from the base station by the user equipment or may be performed by the user equipment when the base station or the wireless radio network provide corresponding measurement gaps in which the user equipment can perform the measurements. This enables suitable handovers even when the user equipment is communicating via a relayed communication.

According to an embodiment, the base station is configured to perform the above-described method and comprises therefore also the advantages described above.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
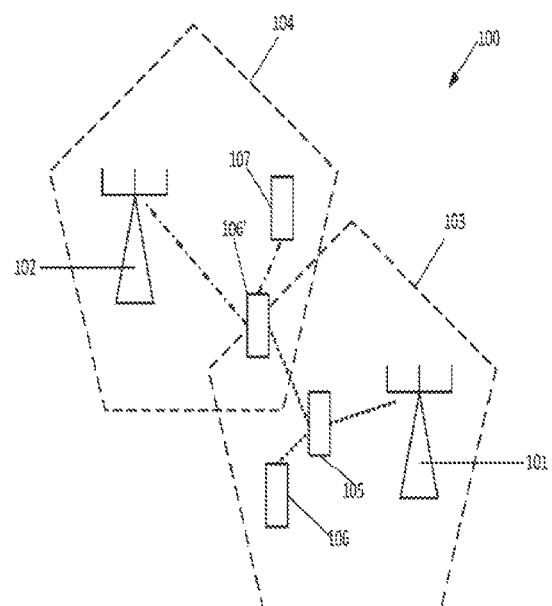
FIG. 1 shows a wireless radio network comprising two cells served by two base stations, a relaying node and a user equipment.

FIG. 1 shows a wireless radio network 100, for example an access network according to GSM (global system for mobile communication), UMTS (universal mobile telecommunication system), WCDMA and LTE defined in 3GPP (third generation partnership project) or future 5G. The wireless radio network 100 comprising a first base station 101, a second base station 102, a first user equipment 105 and a second user equipment 106. The first base station 101 serves communication devices arranged within a first cell 103 and the second base station 102 serves devices arranged within a second cell 104. However, due to better coverage, capacity, load balancing, mobility or other reasons, the base station 101 may not serve the user equipment 106 directly, but indirectly via user equipment 105 which is acting as a relay node. Therefore, communication data exchange between the second user equipment 106 and the base station 101 is transmitted to and forwarded by the relay node 105.

In this relay situation the second user equipment 106 may be moving along the arrow to a position indicated by reference sign 106' which is arranged within the second cell 104. However, the signal strength from the first user equipment 105 at the second user equipment 106 at the position 106' may be still sufficient and therefore does not fall below an operator defined threshold for neighbor cell measurements. Thus a handover to the base station 102 may not occur, although it may be advisable to switch over to the base station 102 due to better signal strength and load in the second cell 104.

Figure 2:
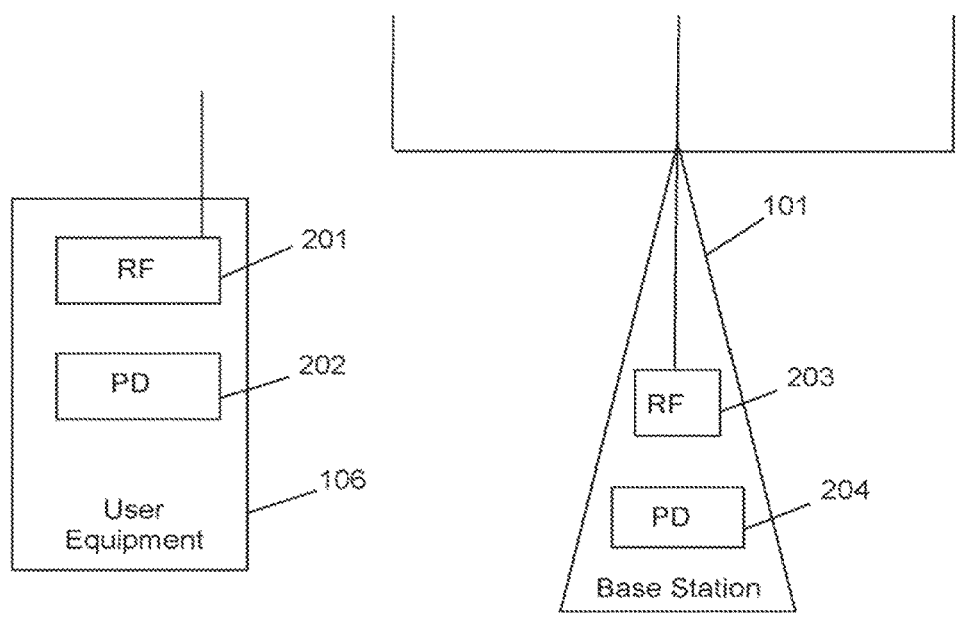
FIG. 2 shows a user equipment and a base station according to embodiments of the present invention.

To improve the situation described above in connection with FIG. 1, the user equipment 106 or the base station 101, which are shown in more detail in connection with FIG. 2 are configured to perform a method described below in connection with FIG. 3. As illustrated in FIG. 1, based on the relayed communication state of the user equipment 106 at the position 106', a measurement of characteristics of a further direct radio transmission link between the user equipment 106 and the wireless radio network is initiated. The further direct radio transmission link may be, for example, a direct radio transmission link between the user equipment 106 and the second base station 102, or a direct radio transmission link between user equipment 106 and a further node 107 configured to relay communication data of the user equipment 106.

FIG. 2 shows the user equipment 106 and the base station 101 in more detail. The user equipment 106 comprises a radio frequency interface (RF) 201 and a processing device (PD) 202. The radio frequency interface (201) is configured to communicate wirelessly with another user equipment via a corresponding direct radio transmission link as indicated in FIG. 1, or to communicate wirelessly with a base station via a corresponding direct radio transmission link. The processing device 202 is configured to perform the method steps of the method of FIG. 3 which will be explained below in more detail.

The base station 101 comprises a wireless radio frequency interface (RF) 203 and a processing device (PD) 204. The wireless radio frequency interface 203 is configured to communicate wirelessly with a user equipment via a direct radio transmission link. The communication data communicated via the direct radio transmission link may comprise communication data which is designated for the user equipment or which has been generated by the user equipment. However, the user equipment may act as a relay node for relaying communication data between a further user equipment and the base station. In this case, communication data transmitted via the direct radio transmission link from the base station to the user equipment is relayed by the user equipment to the further user equipment, and vice versa, the base station may receive communication data which has been generated by the further user equipment and which is forwarded by the user equipment via the direct radio transmission link to the base station. The processing device 204 may implement a functionality which will be described in more detail in connection with FIG. 3.

Figure 3:
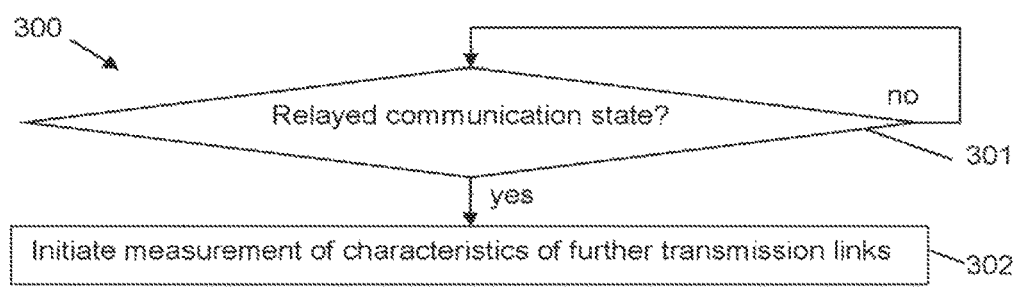
FIG. 3 shows a method for operating a user equipment in a wireless radio network according to an embodiment of the present invention.

FIG. 3 shows a method 300 which may be performed in part or as a whole by the processing device 202 of the user equipment 106 or by the processing device 204 of the base station 101. In general, in step 301 a relayed communication state is determined. The relayed communication state indicates that the user equipment is communicating via a relay node. If it has been determined that the user equipment is communicating via a relay node, in step 302 a measurement of characteristics of a further direct radio transmission link between the user equipment and the wireless radio network is initiated.

The measurement of characteristics of further direct radio transmission links between the user equipment and the wireless radio network relate to measurements in an environment of the user equipment, for example neighbor cell measurements and measurements concerning radio transmissions to other user equipments acting as relay nodes. Typically, the user equipment monitors the current signal of the current direct transmission link and compares for example a received signal strength and quality with network defined parameter values. If the current signal is too weak and/or the quality is too low, the user equipment will start measuring signal quality on neighbor cells and report the results to the network. The network may then decide a handover. As described above in connection with FIG. 1, this may lead to insufficient scenarios and arrangements, especially in relayed scenarios.

Therefore, if it is determined, for example by the processing device 204 of the base station 101, that the user equipment 106 is receiving its signal via the relay node 105, the network, for example the base station 101 or a network layer of the network 100, will request the user equipment to report measurements, for example specific inter and intra RAT neighbor cell reportings, via measurement control commands. The requests will be sent at a network defined timing, for example periodically. Additionally, the network may provide measurement gaps to enable the user equipment to perform the required measurements.

Additionally, or as an alternative, upon detecting in the processing device 202 of the user equipment 106 that the user equipment 106 is communicating via a relay node, the user equipment 106 may conduct periodic neighbor cell reporting. This could be realized for example by the user equipment 106 which performs inter and intra RAT measurements and which reports the measurements autonomously to the base station. A suitable report message for a wideband code division multiple access (WCDMA) network may be the reporting event 1D: "change of best cell", and for LTE networks for example reporting event A3 "neighbor becomes offset better than PCell" or reporting event A4 "neighbor becomes better than threshold". Additionally, a network scheduler or network controller, for example a base station, may ensure that the user equipment is provided with measurement gaps for these measurements without explicit signaling. Providing the measurement gaps may be foreseen in general or may be activated by for example the processing device 204 of the base station 101 depending on a determination of the relayed communication state.

In a further approach, which may be used as an alternative or in connection with the above-described approaches, the user equipment 106 may automatically send a report to the radio access network 100 indicating a degraded transmission quality independently from an actual transmission quality, which means that the report indicating the degraded transmission quality may be sent although the actual transmission quality is good. For a WCDMA network, for example a reporting event 1F "a primary CPICH becomes worse than an absolute threshold" may be used for reporting, and for LTE an event A2 "serving becomes worse than threshold" may be used for reporting. This reporting would initiate procedures for neighbor cell measurements in the base station and ensure that the network scheduler provides the user equipment with measurement gap possibilities.

No matter which of the above-described approaches are implemented, the amount of control signaling within the wireless radio access network may be reduced or minimized as will be described in the following. One or more parameter thresholds may be defined that shall be fulfilled in order for the neighbor cell measurements to be transmitted from the user equipment to the radio access network. Hence, the above-described approaches ensure that the user equipment will start conducting measurements in the required scenarios, while these parameter thresholds, controlled for example by the network, may limit the actual reporting of the measurements to situations when it is likely that the reported measurement results are relevant for the network. For example, parameter thresholds may be defined such that control signaling is initiated only when the measured neighbor cell has a received signal strength and/or signal quality above a defined value or a measured neighbor cell received signal strength and/or signal quality has for at least a certain amount of time exceeded certain threshold values. Furthermore, control signaling may be initiated when the measured neighbor cell signal strength and/or quality is better than the relayed link equivalent, or when the measured neighbor cell received signal strength and/or quality has for at least a certain amount of time exceeded the relayed link equivalent. The parameter thresholds for limiting measurement report transmissions may be signaled as part of a radio resource control (RRC) signaling and may be added to standards and specifications for 3GPP and/or LTE, for example.

The invention claimed is:

1. A method for operating a user equipment in a wireless radio network, the wireless radio network comprising a base station and at least one node, the at least one node being configured to relay communication data between the user equipment and the base station, wherein the user equipment is configured to communicate directly with one node of the at least one node via a corresponding direct radio transmission link, the method comprising:

determining, by the user equipment, a relayed communication state between the user equipment and the one node of the at least one node, the relayed communication state indicating that the user equipment is communicating with the one node of the at least one node via the direct radio transmission link and that communication data of the user equipment is relayed from the user equipment and the base station via the one node of the at least one node; and in response to determining the relayed communication state indicating that the user equipment is communicating with the one node of the at least one node via the direct radio transmission link and that the communication data of the user equipment is relayed from the user equipment to the base station via the one node of the at least one node, initiating, by the user equipment, a measurement of characteristics of a further direct radio transmission link between the user equipment and the wireless radio network, wherein the further direct radio transmission link is a link on which the user equipment is not currently communicating, wherein the initiating the measurement of the characteristics of the further direct radio transmission link comprises at least one of:

initiating a measurement of a characteristic of a direct radio transmission link between the user equipment and a further base station of the wireless radio network; and/or initiating a measurement of a characteristic of a direct radio transmission link between the user equipment and a further node of the at least one node of the wireless radio network configured to relay the communication data of the user equipment from the user equipment to the base station or the further base station.

2. The method according to claim 1, wherein the initiating the measurement comprises:

measuring the characteristic of the further direct radio transmission link by the user equipment during a measurement qap provided by the wireless radio network for the measurement; and reporting by the user equipment the measured characteristic of the further direct radio transmission.

3. The method according to claim 1, wherein the initiating the measurement of the further direct radio transmission link comprises:

measuring the characteristic of the further direct radio transmission link periodically during measurement gaps provided by the base station independently from the relayed communication state.

4. The method according to claim 1, wherein the initiating the measurement of the further direct radio transmission link comprises:

reporting from the user equipment to the radio access network a degraded transmission quality of the direct radio transmission link independently from an actual transmission quality of the direct radio transmission link.

5. The method according to claim 1, further comprising in response to the determining the relayed communication state indicating that the user equipment is communicating with the one node of the at least one node via the direct radio transmission link and that communication data of the user equipment is relayed from the user equipment to the base station via the one node of the at least one node:

measuring the characteristics of the further direct radio transmission link, comparing the measured characteristics of the further direct radio transmission link with a threshold, and reporting the measured characteristics of the further direct radio transmission link based on a result of the comparing.

6. The method according to claim 5, wherein the comparing the measured characteristics of the further direct radio transmission link with the threshold comprises comparing the measured characteristics of the further direct radio transmission link with a threshold comprising at least one of a group consisting of:
- a predetermined received signal strength value,
- a predetermined symbol error rate value,
- a predetermined time period value,
- a received signal strength value derived from a received signal strength of the direct radio communication between the user equipment and the one node,
- a symbol error rate value derived from a symbol error rate of the direct radio communication between the user equipment and the one node, and
- a detection of a new cell.

7. The method according to claim 5, further comprising: receiving by the user equipment the threshold from the wireless radio network.

8. The method according to claim 1, wherein the initiating the measurement of the characteristics of the further direct radio transmission link comprises initiating the measurement of at least one of a group consisting of:
- a received signal strength, and
- a symbol error rate.

9. The method according to claim 1, further comprising the user equipment communicating with a further user equipment as the further node.

10. The method according to claim 1, further comprising: in response to determining the relayed communication state indicating that the user equipment is communicating with the one node of the at least one node via the direct radio transmission link and that the communication data of the user equipment is relayed from the user equipment to the base station via the one node of the at least one node, measuring, by the user equipment, the characteristic of the further direct radio transmission link on which the user equipment is not currently communicating between the user equipment and the wireless radio network.

11. The method according to claim 1, further comprising: in response to determining the relayed communication state indicating that the user equipment is communicating with the one node of the at least one node via the direct radio transmission link and that the communication data of the user equipment is relayed from the user equipment to the base station via the one node of the at least one node, measuring, by the user equipment, the characteristic of the further direct radio transmission link between at least one of:
- the user equipment and the further base station of the wireless radio network; and/or
- the user equipment and the further node of the wireless radio network configured to relay the communication data of the user equipment from the user equipment to the base station or to the further base station.

12. The method according to claim 1, further comprising: in response to determining the relayed communication state indicating that the user equipment is communicating with the one node of the at least one node via the direct radio transmission link and that the communication data of the user equipment is relayed from the user equipment to the base station via the one node of the at least one node, initiating a handoff of the user equipment from the one node of the at least one node to at least one of:
- the further base station of the wireless radio network; and/or
- the further node of the wireless radio network configured to relay the communication data of the user equipment from the user equipment to the base station or to the further base station following the handoff.

13. The method according to claim 1, wherein the initiating the measurement of the characteristic of the further direct radio transmission link between the user equipment and the wireless radio network comprises:
initiating the measurement of the characteristic of the further direct radio transmission link between the user equipment and the wireless radio network by:
reporting from the user equipment to the wireless network a quality level of the direct radio transmission link between the user equipment and the one node of the at least two nodes sufficient to cause the base station to initiate one or more procedures for the base station to provide measurement gaps to the user equipment for the user equipment to measure the characteristic of the further direct radio transmission link between the user equipment and the wireless radio network in the provided measurement gaps.

14. A user equipment for use in an associated wireless radio network, the associated wireless radio network comprising a base station and at least one node, the at least one node being configured to relay communication data between the user equipment and the base station, the user equipment comprising:
a wireless radio interface for communicating wirelessly with one node of the at least one node via a corresponding direct radio transmission link; and
a processor device configured to:
determine a relayed communication state of the user equipment, the relayed communication state indicating that the user equipment is being communicating with the one node of the at least one node via the direct radio transmission link and that communication data of the user equipment is relayed from the user equipment to the base station via the one node of the at least one node; and
in response to determining the relayed communication state indicating that the user equipment is communicating with the one node of the at least one node via the direct radio transmission link and that communication data of the user equipment is relayed from the user equipment to the base station via the one node of the at least one node:
initiate a measurement of characteristics of a further direct radio transmission link between the user equipment and the wireless radio network,
wherein the further direct radio transmission link is a link on which the user equipment is not currently communicating,
wherein the further direct radio transmission link is a link between the user equipment and at least one of:
- a further base station of the wireless radio network; and/or
- a further node of the wireless radio network configured to relay the communication data of the user equipment between the user equipment and the base station or the further base station.

15. The user equipment according to claim 14, wherein the user equipment comprises at least one mobile device selected from the group consisting of a mobile phone, a personal digital assistant, a tablet computer, or a mobile computer.

16. The user equipment according to claim 14, wherein the processor device is configured to, in response to determining the relayed communication state indicating that the user equipment is communicating with the one node of the at least one node via the direct radio transmission link and that communication data of the user equipment is relayed from the user equipment to the base station via the one node of the at least one node, measure the characteristic of the further direct radio transmission link on which the user equipment is not currently communicating between the user equipment and the wireless radio network.

17. The user equipment according to claim 14, wherein the processor device is configured to, in response to determining the relayed communication state indicating that the user equipment is communicating with the one node of the at least one node via the direct radio transmission link and that communication data of the user equipment is relayed from the user equipment to the base station via the one node of the at least one node, measure the characteristic of the direct radio transmission link between at least one of:
the user equipment and the further base station of the wireless radio network; and/or
the user equipment and the further node of the wireless radio network configured to relay the communication data of the user equipment between the user equipment and the base station or the further base station.

18. The user equipment according to claim 14, wherein the processor device is configured to, in response to determining the relayed communication state indicating that the user equipment is communicating with the one node of the at least one node via the direct radio transmission link and that communication data of the user equipment is relayed from the user equipment to the base station via the one node of the at least one node, initiate a handoff of the user equipment from the one node of the at least one node to at least one of:
the further base station of the wireless radio network; and/or
the further node of the wireless radio network configured to relay the communication data of the user equipment from the user equipment to the base station or to the further base station following the handoff.

19. The user equipment according to claim 14, wherein the processor device is configured to initiate the measurement of the characteristic of the further direct radio transmission link between the user equipment and the wireless radio network by:
reporting from the user equipment to the wireless network a quality level of the direct radio transmission link between the user equipment and the one node of the at least two nodes sufficient to cause the base station to initiate one or more procedures for the base station to provide measurement gaps to the user equipment for the user equipment to initiate the measurement of the characteristic of the further direct radio transmission link between the user equipment and the wireless radio network in the provided measurement gaps.

20. A base station for use in an associated wireless radio network, the associated wireless radio network comprising the base station and at least one node, the at least one node being configured to relay communication data between a user equipment and the base station, wherein the user equipment is configured to communicate directly with one node of the at least one node via a corresponding direct radio transmission link, the base station comprising:
a wireless radio interface for communicating wirelessly with at least one of the user equipment and the at least one node via a direct radio transmission link; and
a processor device configured to:
determine a relayed communication state, the relayed communication state indicating that the user equipment is communicating with the one node of the at least one node via the direct radio transmission link and that communication data of the user equipment is relayed from the user equipment to the base station via the one node of the at least one node; and
in response to determining the relayed communication state indicating that the user equipment is communicating with the one node of the at least one node via the direct radio transmission link and that the communication data of the user equipment is relayed from the user equipment to the base station via the one node of the at least one node, initiate a measurement by the user equipment of characteristics of a further direct radio transmission link between the user equipment and the wireless radio network,
wherein the further direct radio transmission link is a link on which the user equipment is not currently communicating,
wherein the further direct radio transmission link is a link between the user equipment and at least one of:
a further base station of the wireless radio network; and/or
a further node of the wireless radio network configured to relay the communication data of the user equipment between the user equipment and the base station or the further base station.

\* \* \* \* \*